(12) United States Patent
Stafford (10) Patent No.: US 9,031,602 B2
(45) Date of Patent: May 12, 2015

(54) MOBILE DEVICE TO BASE STATION REASSIGNMENT

(71) Applicant: Exelis Inc., McLean, VA (US)

(72) Inventor: James F. Stafford, Herndon, VA (US)

(73) Assignee: Exelis Inc., McLean, VA (US)

( * ) Notice: Subject to any disclaimer, the term of this patent is extended or adjusted under 35 U.S.C. 154(b) by 241 days.

(21) Appl. No.: 13/633,959

(22) Filed: Oct. 3, 2012

(65) Prior Publication Data

US 2014/0094217 A1    Apr. 3, 2014

(51) Int. Cl.
*H04W 36/22* (2009.01)
*H04B 7/185* (2006.01)

(52) U.S. Cl.
CPC ........... *H04B 7/18506* (2013.01); *H04W 36/22* (2013.01)

(58) Field of Classification Search
None
See application file for complete search history.

(56) References Cited

U.S. PATENT DOCUMENTS 5,914,948 A    6/1999 Frank
2011/0292907 A1*  12/2011 Tieftrunk et al. ............. 370/331

FOREIGN PATENT DOCUMENTS

EP    2278732 A2    1/2011

OTHER PUBLICATIONS

European Search Report in corresponding European Patent Application No. 13 184 235.3, dated Jan. 23, 2014.

* cited by examiner

*Primary Examiner* — Philip Sobutka (74) *Attorney, Agent, or Firm* — Edell, Shapiro & Finnan LLC (57) ABSTRACT

Techniques are presented herein for load balancing of mobile devices among a plurality of bases stations. Specifically, it is determined via a processor whether to reassign a mobile device from a first base station to a second base station, wherein the second base station is one of a plurality of base stations whose operational performance may be impacted by reassigning the mobile device to the second base station. The expected performance that would result if the mobile device is assigned to the second base station is evaluated for each base station in the plurality. The mobile device is reassigned to the second base station in response to the expected performance of each of the plurality of base stations meeting operational performance requirements.

25 Claims, 8 Drawing Sheets

MOBILE DEVICE TO BASE STATION REASSIGNMENT

BACKGROUND

The present disclosure relates to communication between mobile devices and multiple base stations, and in particular, aircraft communication with multiple ground stations.

Specifically, mobile devices are often in communication with a series of base stations as the movement of the mobile device causes it to lose line of the sight with the base station with which it was previously in communication. For example, as an aircraft travels across the country, it will be assigned to communicate with a series of ground stations as it loses and achieves line of sight with different ground stations during its travels.

If the amount of traffic between aircraft and ground stations becomes too great at a specific frequency, the time between the generation of a message and its transmission or receipt may become large. In other words, if too much traffic is present on a specific frequency, the latency of messages may become unacceptably large, resulting in unacceptably long delays in communication, and even dropped or lost messages.

SUMMARY

Techniques are presented herein for load balancing of mobile devices among a plurality of bases stations. Specifically, it is determined via a processor whether to reassign a mobile device from a first base station to a second base station, wherein the second base station is one of a plurality of base stations whose operational performance may be impacted by reassigning the mobile device to the second base station. The expected performance that would result if the mobile device is assigned to the second base station is evaluated for each base station in the plurality. The mobile device is reassigned to the second base station in response to the expected performance of each of the plurality of base stations meeting operational performance requirements.

According to specific examples, the mobile devices comprise aircraft, and the base stations comprise ground stations.

DETAILED DESCRIPTION

Figure 1:
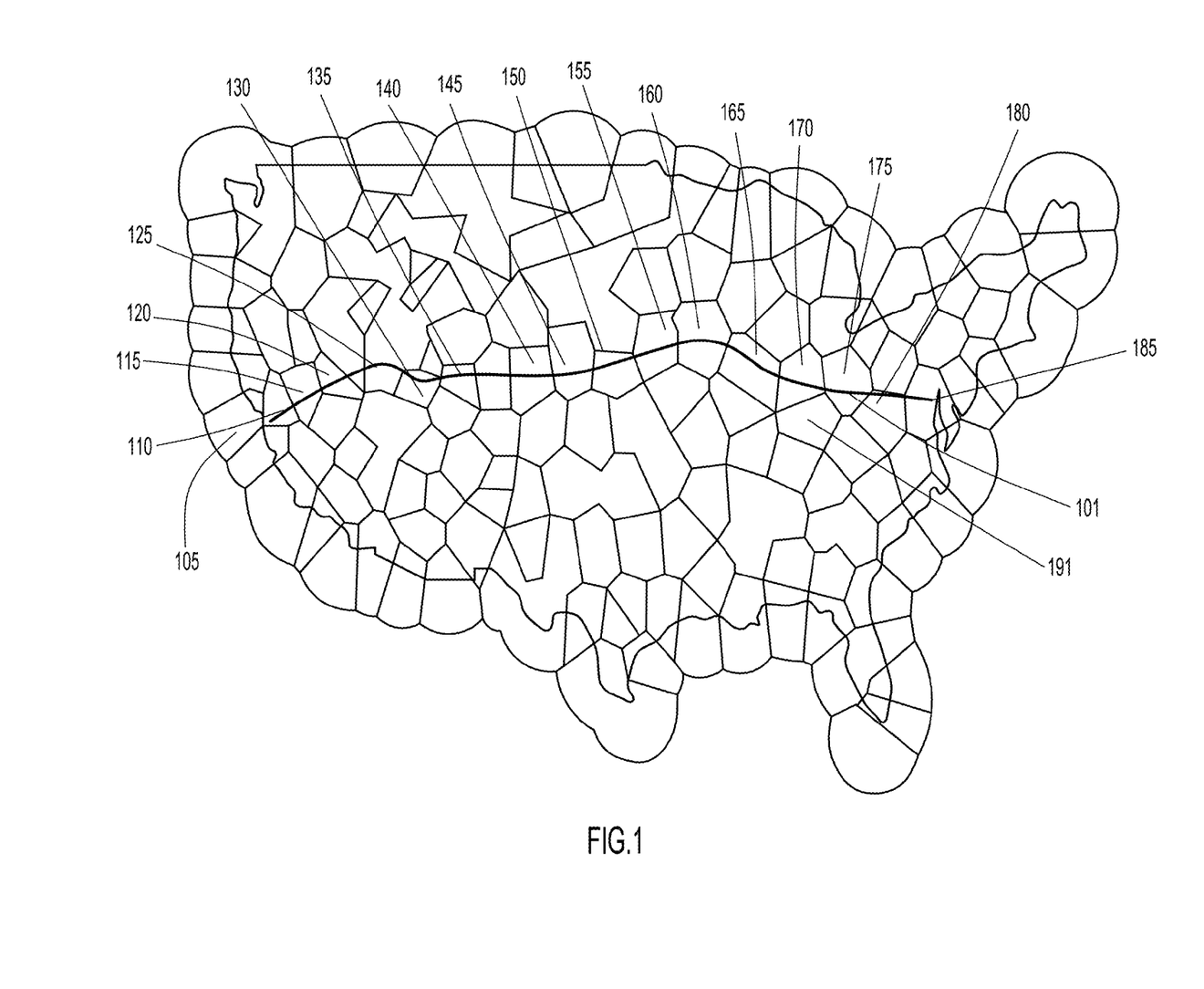
FIG. 1 is an illustration of a path taken by a mobile device traversing areas serviced by multiple base stations.

Depicted in FIG. 1 is an illustration of an example system of grounds stations used to track aircraft traffic across the United States. The scheme shown in FIG. 1 involving aircraft and ground stations represents one example of communication between mobile devices and base stations. It will be appreciated that the communication techniques described herein are applicable to other types of mobile devices and base stations and are not limited to the specific example involving the aircraft and ground stations of FIG. 1.

If an aircraft travels from San Francisco to Washington, D.C. along path 101, under low air traffic conditions, the aircraft may be in communication with the ground stations corresponding to the areas covered by reference numerals 105-185. Alternatively, if the ground station corresponding to reference numeral 170 has a large number of aircraft assigned to it, or is within line of sight of a large number of aircraft operating at the same frequency, the ground station may be unable to meet performance requirements for the ground station. Therefore, some aircraft may be assigned to, for example, the ground station corresponding to region 191 so long as the aircraft pass within line of sight of ground station 191. Accordingly, systems and methods for load balancing the assignment of mobile devices to base stations shall be described in more detail with reference to FIGS. 2-5.

Figure 2:
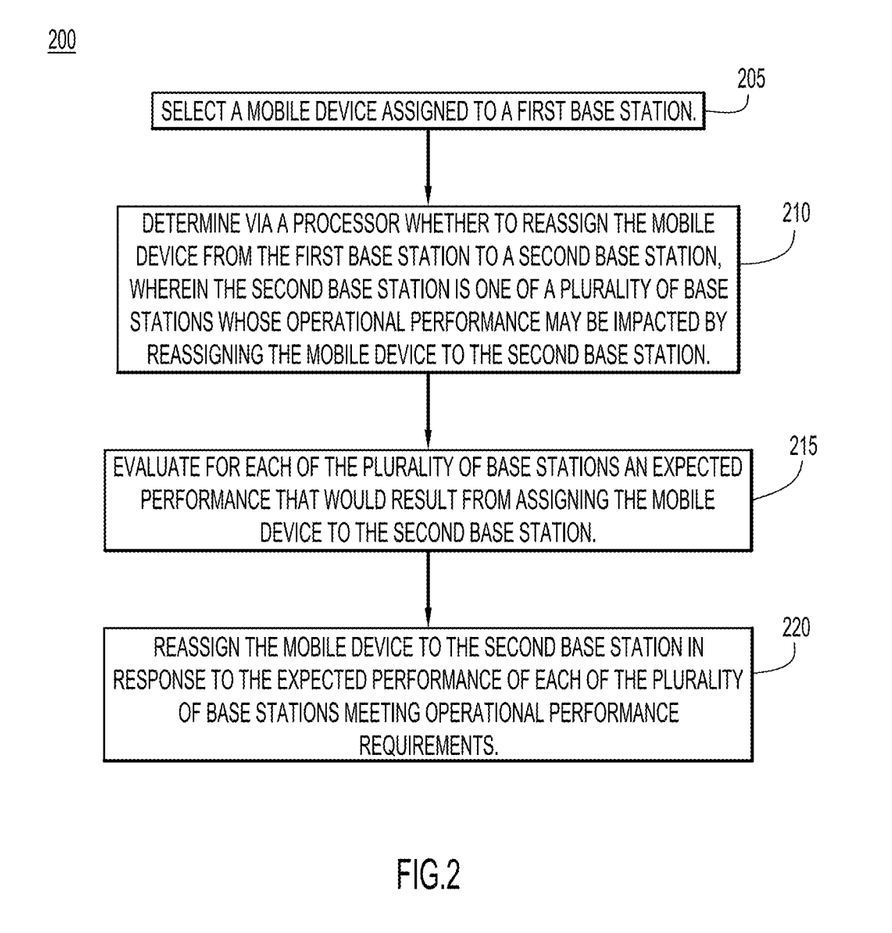
FIG. 2 is a flowchart illustrating an example procedure for reassigning a mobile device from a first base station to a second base station.

Turning now to FIG. 2, an example process 200 of load balancing mobile devices across a system of base stations is illustrated. The process begins in step 205 with the selection of a mobile device which is assigned to a first base station. The mobile device and first base station are part of a system comprising a plurality of mobile devices and plurality of base stations. To use the aircraft example, the mobile devices may comprise aircraft, and the base stations may comprise ground stations used to track aircraft as they travel across the country.

In step 210 a mobile device is selected to be evaluated for reassignment from a first base station to a second base station. To use the aircraft example again, aircraft may be selected for reassignment based on a number of factors. For example, it may be determined that the selected aircraft will soon lose line of the sight with the ground station to which it is currently assigned. Accordingly, to maintain communication with a ground station, the aircraft will need to be reassigned. Alternatively, in order to maintain an efficient balancing of aircraft and ground stations, a simple probability may be used to determine whether or not a selected aircraft will be evaluated for reassignment. For example, every aircraft may have a 50/50 probability of being selected for evaluation for reassignment. Specifically, all of the aircraft in the system may be cycled through. Each aircraft, in turn, has a 50% chance of being evaluated for reassignment. Other probabilities may also be used. As yet another example, a combination of probability and location of the aircraft may be used to determine whether the selected aircraft should be evaluated for reassignment. For example, as the an aircraft gets closer to losing line of sight with its currently assigned ground station, the probability that the selected aircraft will be evaluated for reassignment may increase. According to yet another example, the aircraft in the system may be ranked for evaluation according to factors such as how close an aircraft is to losing line of sight with its currently assigned ground station and how long it has been since the aircraft was previously evaluated. Furthermore, the selection of an aircraft for reassignment may be based on the ground station to which it is currently assigned. For example, if a ground station is currently servicing a high volume of aircraft, the aircraft assigned to that ground station may be more likely to be selected for reassignment. Of course, if an aircraft is to be assigned to a second ground station, the aircraft should be in line of sight of the second ground station.

According to the present example, the second base station may be part of a plurality of base stations whose operational performance may be impacted by reassigning the mobile device to the second base station. According to specific examples, the performance of the plurality of ground stations may be negatively affected by the reassignment of the mobile device Continuing with the aircraft example, if all of the ground stations of the plurality utilize the same operational frequency, and if more than one ground station of the plurality is within line of sight of the aircraft to be reassigned, messages sent from the reassigned aircraft to its assigned ground station may also be received at other ground stations in the plurality. The receipt of these messages at the other ground stations in the plurality may negatively affect their performance by, for example, increasing the latency of messages between the ground stations and their assigned aircraft. Similarly, messages sent from the reassigned aircraft to its assigned ground station may be received by aircraft assigned to other ground stations in the plurality, degrading the performance of these aircraft and their assigned ground stations.

Accordingly, in step 215 the expected performance of every base station in the plurality of base stations is evaluated as if the mobile device is assigned to the second base station. Remaining with the aircraft example, if it is determined that the selected aircraft is to be assigned to the second ground station, the performance after the proposed reassignment of the selected aircraft will be evaluated for every ground station in the plurality of ground stations. Specifically, the reassignment of the aircraft to the second ground station may affect the performance of other ground stations within the plurality of ground stations, as will be described in detail with reference to FIGS. 3-5 below. Accordingly, the performance of every ground station within the plurality of ground stations may be evaluated.

Finally, the process completes in step 220 when the selected mobile device is reassigned to the second base station if the expected performance of each of the plurality of base stations meets operational performance requirements. Once again using the aircraft example, if the evaluation of each ground station in the plurality of ground stations indicates that every ground station in the plurality will meet or surpass a performance threshold, the selected aircraft may be assigned to the second ground station.

Figure 3:
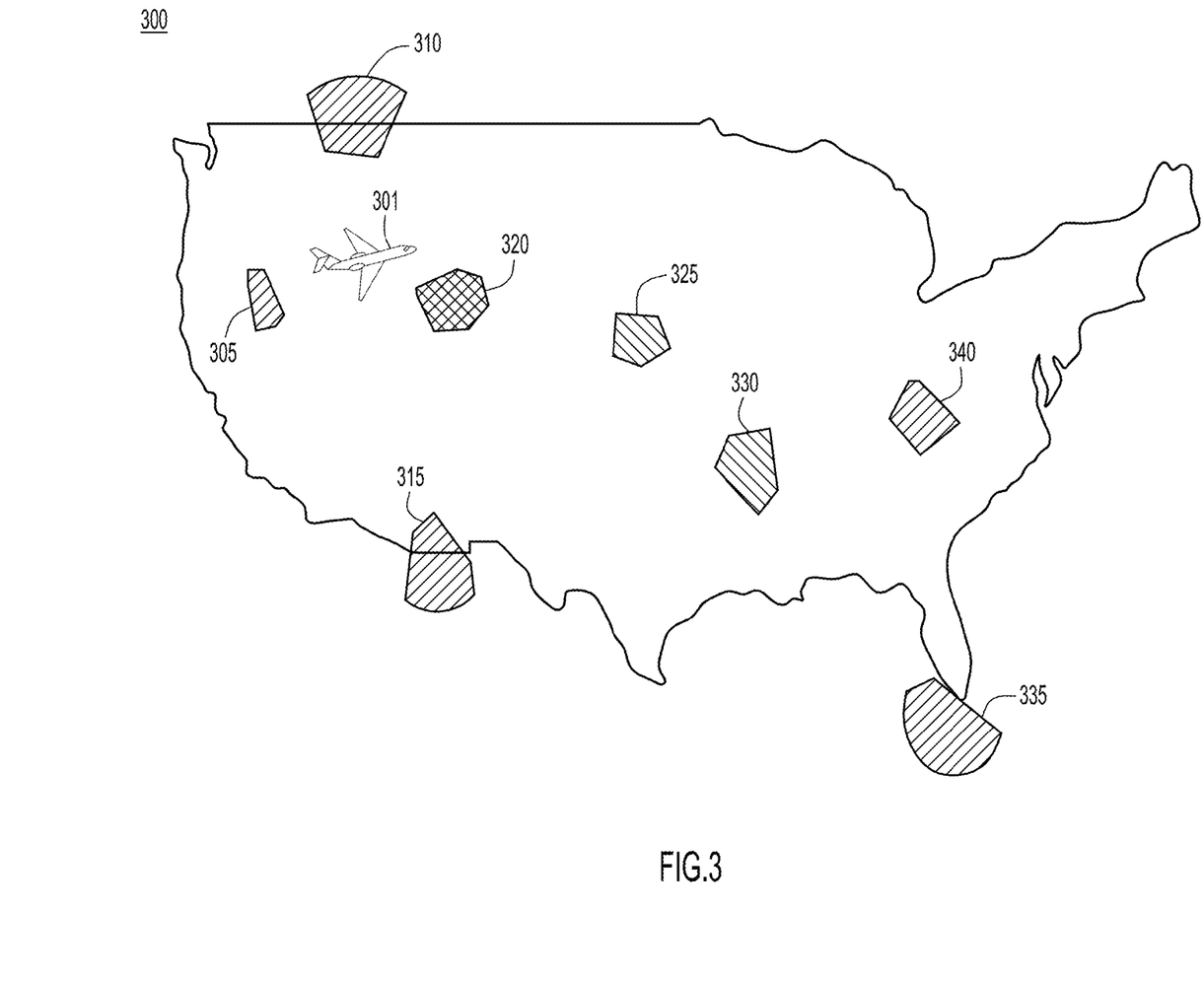
FIG. 3 is an illustration of the performance of multiple ground stations operating at a single frequency.

With reference made to FIG. 3, depicted therein is map 300 of aircraft 301 traversing the United States. Included on map 300 are ground stations 305-340 which all operate at the same communication frequency. As indicated by their shading, ground stations 305, 310, 315, 335 and 340 are all operating well above a performance threshold. Ground station 320 is approaching being unable to meet the performance threshold, while ground stations 325 and 330 are in danger of falling below the performance threshold.

As aircraft 301 traverses the county, it is necessary for it to be reassigned from one ground station to another. For example, as aircraft 301 approaches ground station 320, there may be an attempt to assign aircraft 301 to communicate with ground station 320. Because ground station 320 is in danger of failing to meet its performance threshold, the performance of ground station 320 may be evaluated before reassigning aircraft 301 to ground station 320. However, simply evaluating the performance of ground station 320 may be insufficient. The performance of additional ground stations that operate at the same frequency as ground station 320 may be evaluated. For example, if ground stations 325 and 330 are within line of sight of aircraft 301, when aircraft 301 switches to the frequency shared by ground stations 305-340, the messages communicated between aircraft 301 and ground station 320 may negatively affect the performance of ground stations 325 and 330. Specifically, if aircraft 301 is within line of sight of ground station 325, message sent to ground station 320 from aircraft 301 may be received at ground station 325. Because ground station 325 is dangerously close to falling below the performance threshold, the additional messages received from aircraft 301 may cause ground station 325 to fall below the required performance threshold. Similarly, messages sent from aircraft 301 may be received by the aircraft assigned to ground station 325, further degrading the performance of ground station 325.

Figure 4:
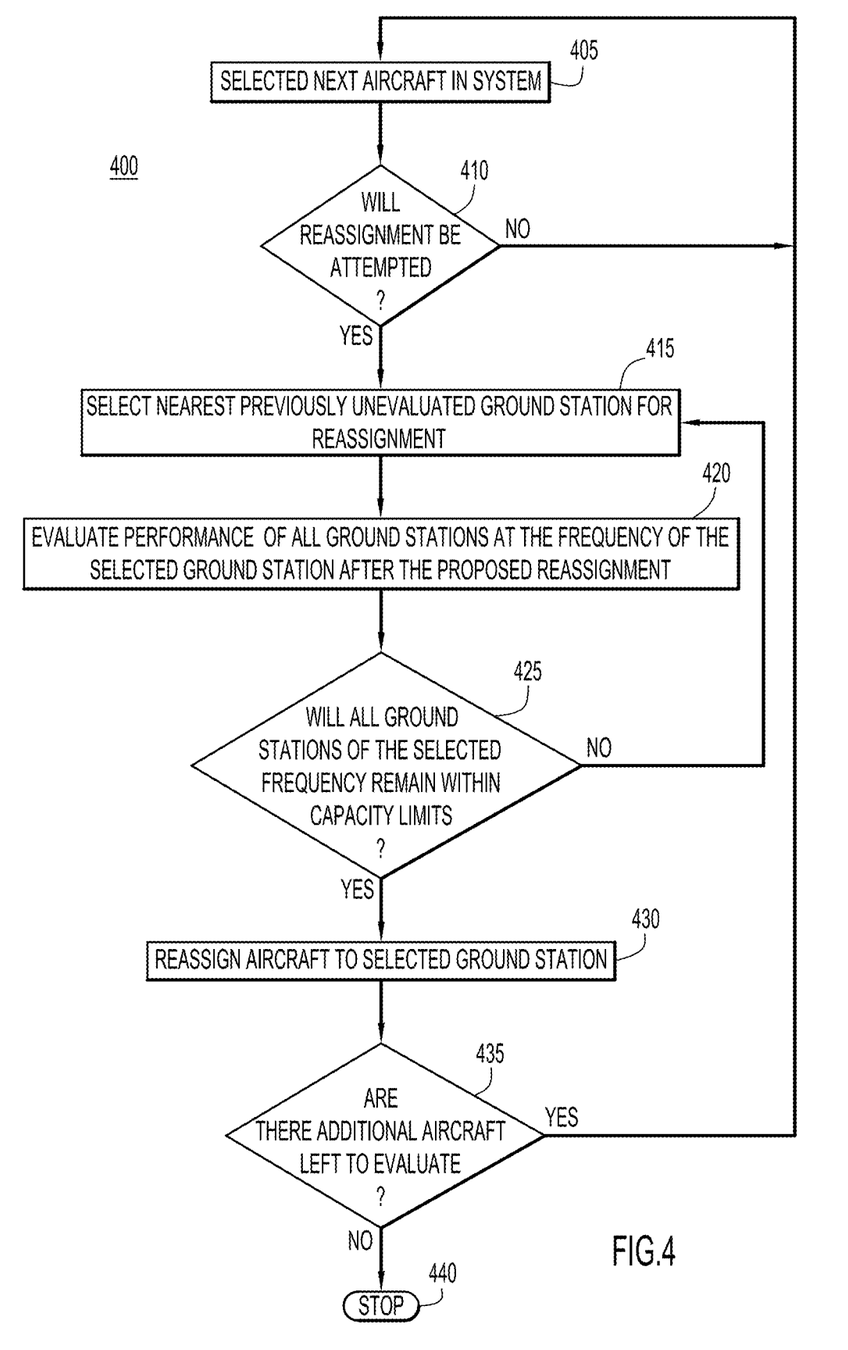
FIG. 4 is flowchart illustrating an example procedure for reassigning an aircraft from a first ground station to a second ground station.

Referring now to FIG. 4, depicted therein is a process 400 for reassigning aircraft according the to the performance of both the ground station to which the aircraft is to be assigned, as well as other ground stations that may be affected by the reassignment.

Beginning in step 405, an aircraft is selected. In step 410 it is determined whether or not the aircraft is to be evaluated for reassignment. For example, it may be determined that the selected aircraft will soon lose line of the sight with the ground station to which it is currently assigned, and therefore, will need to be reassigned. The aircraft may also be selected for reassignment if a long time has passed since the aircraft's last reassignment. Additionally, a simple probability may be used to determine whether or not a selected aircraft will be evaluated for reassignment. For example, each aircraft in the system may have a 50% chance of being evaluated for reassignment. Of course, a combination of factors may be used to determine whether the selected aircraft should be evaluated for reassignment. For example, as the selected aircraft gets closer to losing line of sight with its currently assigned ground station, the probability that the selected aircraft will be evaluated for reassignment may increase. If it is determined that the aircraft will not be evaluated for reassignment, the process returns to step 405, and another aircraft is selected. Alternatively, if the aircraft is to be evaluated for reassignment, the process proceeds to step 415.

In step 415, the nearest previously unevaluated ground station is selected. According to this example, the selected ground station may also be the nearest ground station that is within line of sight of the selected aircraft.

Figure 5:
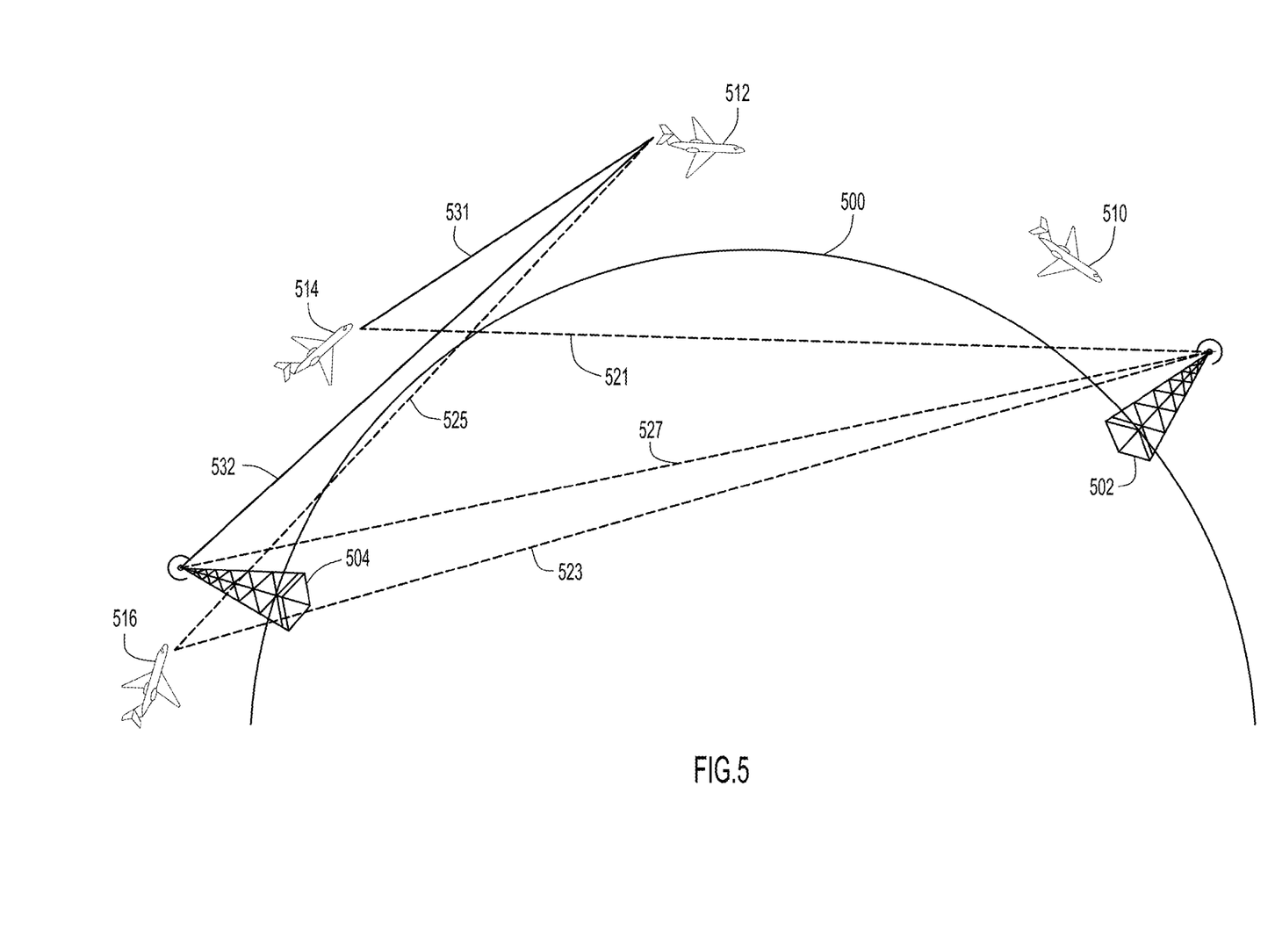
FIG. 5 is an illustration of assigned aircraft, non-cooperative aircraft, and non-cooperative ground stations relative to a ground station.

Proceeding to step 420, the performance of all ground stations at the communication frequency of the selected ground station is evaluated. In order to evaluate the performance of each ground station, a number of factors are taken into account. Turning to FIG. 5, depicted therein are a number of example factors that may be used to evaluate the performance of a ground station.

Specifically, depicted in FIG. 5 is an illustration of a region of the Earth 500 with an exaggerated radius of curvature in order to better illustrate the effects of line of sight on the evaluation of ground station performance. According to the example of FIG. 5, the performance of ground station 502 is to be evaluated. Both ground stations 502 and 504 operate at the same communication frequency, and aircraft 510 and 512 are assigned to ground station 502 while aircraft 514 and 516 are assigned to ground station 504.

In order to evaluate the performance of ground station 502, the number of aircraft assigned to ground station 502 is determined. Accordingly, it is determined that two aircraft, aircraft 510 and 512, are assigned to ground station 502.

According to the example, it is further determined how many "non-cooperative" aircraft may affect the performance of ground station 502. As used in this disclosure, "non-cooperative" refers to a device which is unable to communicate with the base station being evaluated, but is able to communicate with a mobile device assigned to the base station. Within the context of the aircraft example, a non-cooperative aircraft is an aircraft which communicates at the same frequency as the ground station being evaluated, is not assigned to the ground station, and is not within line of sight of the ground station, but is within line of sight of an aircraft assigned to the ground station being evaluated. Accordingly, aircraft 514 is a non-cooperative aircraft for ground station 502. Specifically, aircraft 514 does not have direct line of sight with ground station 502 as indicated by line 521, but is within line of sight of aircraft 512, as indicated by line 531, and aircraft 512 does have direct line of sight with ground station 502.

On the other hand, aircraft 516 is not considered a non-cooperative aircraft with respect to ground station 502, because it lacks line of sight with both ground station 502, as indicated by line 523, and aircraft 512, as indicated by line 525.

The non-cooperative aircraft must be considered even though ground station 502 will not receive any messages from these aircraft because aircraft such as aircraft 512 will receive messages from the non-cooperative aircraft, which may negatively affect the performance of aircraft 512 and ground station 502. For example, aircraft such as aircraft 512 may experience delays in sending messages and receiving messages due to the messages received from non-cooperative aircraft 514.

According to the present example, the average number of non-cooperative aircraft visible to each assigned aircraft will be used to evaluate the performance of the ground stations. In FIG. 1, there will be an average number of ½ non-cooperative aircraft. Specifically, aircraft 512 has line of sight to one non-cooperative aircraft, aircraft 514, while aircraft 510 does not have line of sight to any non-cooperative aircraft. As there is only one non-cooperative aircraft and two assigned aircraft, the average number of non-cooperative aircraft visible to each assigned aircraft is ½. Alternative examples may use the total number of non-cooperative aircraft or other alternative methods of weighting the non-cooperative aircraft.

In order to calculate the average number of non-cooperative aircraft, the following mathematical formula may be used:

$$H_i = \frac{\sum_{k \in N_i} \sum_{j \in N \setminus N_i} vis(k, j)}{N_i}$$

where $H_i$ represents the average number of non-cooperative aircraft, N is the set of aircraft assigned to ground stations communicating at the communication frequency of the ground station being evaluated; $N_i$ is the set of aircraft assigned to the ground station i; $N_i$ is the number of aircraft in set $N_i$; and vis(k,j) is a function that evaluates to 1 if aircraft k and j are within line of sight of each other, and evaluates to zero if aircraft k and j are not within line of sight of each other.

In order to evaluate vis(k, j), the visibility distance to the horizon for each aircraft may be determined. The visibility distance to the horizon from a given height h on a sphere of radius $R_e$, in this case, the radius of the Earth, can be determined by:

$$d^2 + R_e^2 = (R_e + h)^2$$

Solving the above equation for d gives:

$$d = \sqrt{h(2R_e + h)} \approx \sqrt{2R_e h}.$$

If h is given in feet (f) and d in nautical miles (nm), the following conversion factors may be used:

$$\gamma_{fpm} = 100/(12 \cdot 2.54)$$

$$\gamma_{mpnm} = 1852$$

$$R_e = 6378137$$

Furthermore, to account for refraction effects, an effective Earth radius multiplier of 4/3 may be used, obtaining the following formula:

$$d = \frac{1}{\gamma_{fpm}\gamma_{mpnm}}\sqrt{2R_{eff}\gamma_{fpm}h} = \frac{\sqrt{2 \cdot (4/3)R_e}}{\sqrt{\gamma_{fpm}\gamma_{mpnm}}}\sqrt{h} = 1.23\sqrt{h} \triangleq \gamma\sqrt{h}$$

Finally, to calculate the visibility distance between two aircraft at heights $h_1$ and $h_2$, the distances to the horizon for each aircraft are summed. Accordingly, the visibility distance $d_v$ between two aircraft is:

$$d_v = \gamma(\sqrt{h_1} + \sqrt{h_2}).$$

Therefore, if it is determined that the distance between two aircraft, one at height $h_1$ and the other at $h_2$, is greater than $d_v$, then there is no line of sight between the two aircraft. Accordingly, vis(k, j) given the altitudes of aircraft k and j, can calculate the distance $d_v$ for the two aircraft. If the actual distance between the aircraft is less than or equal to $d_v$, there is line of sight between the two aircraft, but if the actual distance is greater than $d_v$, there is no line of sight. Accordingly, based on the altitudes of aircrafts k and j, it can be determined whether or not vis(k,j) should evaluate to zero or one.

Applying the formula for $H_i$ to the example depicted in FIG. 5, the parameters for the formula will be as follows:

$$N = \{510, 512, 514, 516\}$$

$$N = 4$$

$$N_i = \{510, 512\}$$

$$N_i = 2$$

$$N/Ni = \{514, 516\}$$

and, therefore:

$$H_i = \frac{\sum_{k \in N_i} \sum_{j \in N \setminus N_i} vis(k, j)}{N_i}$$

$$H_i = \frac{\sum_{k \in \{510,512\}} \sum_{j \in \{514,516\}} vis(k, j)}{2}$$

$$H_i = \frac{vis(510, 514) + vis(510, 516) + vis(512, 514) + vis(512, 516)}{2}$$

$$H_i = \frac{0+0+1+0}{2}$$

$$H_i = \frac{1}{2}$$

Accordingly, as described above in reference to FIG. 5, and as calculated above, there would be an average of ½ non-cooperative aircraft used in the evaluation of ground station 502. Specifically, there is one non-cooperative aircraft visible to assigned aircraft 512, and zero non-cooperative aircraft visible to assigned aircraft 510, and therefore, the average number of non-cooperative aircraft is ½.

According to alternative examples, the number of non-cooperative aircraft can be estimated according to a probabilistic approach. To calculate the average amount of hidden terminal interference per aircraft for a given ground station, suppose there are K ground stations on the same frequency, separated by distances $d_{i,k}$ for $1 \le i, k \le K$, and $p(d_{i,k})$ represents the probability that there will be a non-cooperative aircraft within line of sight of an aircraft assigned to ground station k. Further suppose there are $N_k$ aircraft in service at the $k^{th}$ ground station. Accordingly, the number of hidden aircraft affecting the $i^{th}$ ground station is given by:

$$H_i = \sum_{\substack{1 \le k \le K \\ k \ne i}} p(d_{i,k})|N_k|$$

With the average number of non-cooperative aircraft calculated, the number of non-cooperative grounds stations may also be calculated. A non-cooperative ground station is similar in concept to a non-cooperative aircraft. Specifically, a non-cooperative ground station is out of line of sight of the ground stations being evaluated, but as with a non-cooperative aircraft, a non-cooperative ground station is within line of sight of an aircraft assigned to the ground station being evaluated. Accordingly, ground station 504 would be counted as a non-cooperative ground station during the evaluation of ground station 502. Specifically, even though ground station 504 is not in line of sight with ground station 502, as indicated by line 527, ground station 504 is in line of sight with aircraft 512 as indicated by line 532. Because aircraft 512 is assigned to ground station 502, ground station 504 is considered a non-cooperative ground station during the evaluation of ground station 502.

According to the example of FIG. 5, in order to estimate the effect that non-cooperative ground station 504 has on the performance of ground station 502, the number of aircraft assigned to ground station 504 is added to the average number non-cooperative aircraft $H_i$. As aircraft 514 and 516 are assigned to ground station 504, the total value of $H_i$ for ground station 502 will be 2½, due to the average number of non-cooperative aircraft being ½, and one non-cooperative ground stations, ground station 504, to which two aircraft are assigned.

Once the number of assigned aircraft, non-cooperative aircraft, and non-cooperative ground stations have been calculated, it is possible to estimate the performance for a specific ground station. The performance of a ground station i may be approximated as the success rate for messages, $P_i$, related to the number of assigned aircraft, the number of non-cooperative aircraft and the number of non-cooperative grounds stations. Specifically, the function may take the form of:

$$100 - P_i = aN_i + bH_i$$

where a and b are constant coefficients. Solving for the success rate, $P_i$ yields:

$$P_i = 100 - aN_i - bH_i$$

In other words, the coefficients a and b weight the cost to performance of additional assigned or non-cooperative aircraft.

According to other scenarios, the dependence of performance $P_i$ on H can be quadratic. In such a scenario, $P_i$ is related to $H_i$ and $N_i$ according to:

$$P_i = 100 - aN_i - bH_i - cH_i^2$$

Under such a scenario, the coefficients a, b and c may be found by determining the least squares solution for:

$$\begin{bmatrix} N_1 & H_1 & H_1^2 \\ \vdots & \vdots & \vdots \\ N_K & H_K & H_K^2 \end{bmatrix} \begin{bmatrix} a \\ b \\ c \end{bmatrix} = 100 - \begin{bmatrix} P_1 \\ \vdots \\ P_K \end{bmatrix}$$

where $P_1$ through $P_k$ represent all of the ground stations operating at the same communication frequency. Accordingly, $N_1$ through $N_k$ and $H_1$ through $H_k$ represent the corresponding assigned and non-cooperative aircraft, respectively. Specifically, the coefficients a, b and c may be calculated through a least squares approximation curve fit based $P_i$, $N_i$ and $H_i$ values obtained from the performance history of the system of mobile devices and base stations, or aircraft and ground stations.

Having calculated $P_1$-$P_k$ and returning to step 425 of FIG. 4, it is determined whether or not all ground stations at the selected frequency will remain within their capacity limits after reassignment. For example, it may be determined whether all the ground stations of a selected frequency meet their performance threshold after reassignment of the selected aircraft. For example, if the performance requirement for the system of aircraft is 95, if 95% of all messages are successfully transmitted and received without exceeding the required latency, then the ground station meets its performance requirement. Accordingly, using the calculated $P_i$ as an example, if $P_1$-$P_k$ are all calculated to be greater than or equal to 95, then all ground stations meet or exceed the required performance threshold. On the other hand, if any of $P_1$-$P_k$ is less than 95, then at least one ground station fails to meet the required performance threshold, and the aircraft will not be reassigned. If the aircraft is not reassigned, the process returns to step 415, and the next nearest ground station is selected for evaluation.

In step 430 the aircraft is reassigned to the selected ground station. The reassignment may be made if it is determined that all of the ground stations at the selected frequency will meet their performance requirements, such as a performance threshold, after the reassignment has taken place. Alternatively, the performance threshold as well as additional factors may be considered to determine whether or not the reassignment should take place.

For example, the time left to make a connection may be considered in deciding whether the reassignment should be made. For example, the aircraft/ground station example described in conjunction with FIG. 4 is a dynamic system in which aircraft 510-516 are in motion. Accordingly, it would not make sense to assign an aircraft to a ground station if the aircraft were to quickly leave the range of service provided by the ground station. Specifically, a handover function may be used to determine when reassignment is to take place which takes into account both the performance of the ground station to which the aircraft is to be reassigned, as well as the time left to reassign the aircraft.

One such handover function which takes into account the performance $P_i$, and the time T left to make the connection or handover is:

$$f(T,l) = \beta T(1-l)^\alpha$$

where $\alpha$ and $\beta$ are constants and:

$$l = \begin{cases} 0, & P_i \geq 100 \\ \dfrac{100 - P_i}{5}, & 100 > P_i > 95 \\ 1, & P_i \leq 95 \end{cases}$$

Furthermore, the time T for the aircraft to be reassigned can be found by solving the following equation for T:

$$(x+v_x T)^2 + (y+v_y T)^2 = R^2$$

where (x,y) is the aircraft position east and north of the ground station, and $(v_x, v_y)$ is the aircraft velocity. The value R is the estimated radius of service for the ground station, which may be calculated according to the following formula:

$$R = 1.23(\sqrt{h_{gs}} + \sqrt{h_{ac}})$$

where $h_{gs}$ is the height of the ground station, and $h_{ac}$ is the height of the aircraft.

Accordingly, when $P_i$ is greater than or equal to 100, meaning 100% of the messages communicated to and from ground station i are successful, l=1, and $f(T,l)=\beta T$. In other words, because the ground station will be able to handle all or more of the messages sent after the reassignment of the aircraft, the determination of whether the reassignment will take place will be based solely on $\beta$ and T.

Alternatively, if $P_i$ is between 100 and 95, meaning the performance of the ground station will above the threshold, but not 100% after reassignment, the value for $f(T, l)$ will be based on both T and $P_i$.

Finally, if $P_i$ is less than 95, meaning the performance of the ground station falls below the performance threshold after reassignment, the value of $f(T, l)$ will be zero, and no reassignment will take place.

With the processing of step 430 complete, step 435 will determine whether there are additional aircraft to evaluate for reassignment. If there are additional aircraft, processing will return to step 405. If there are no more aircraft to evaluate for reassignment, the processing will stop at step 440.

Figure 6A:
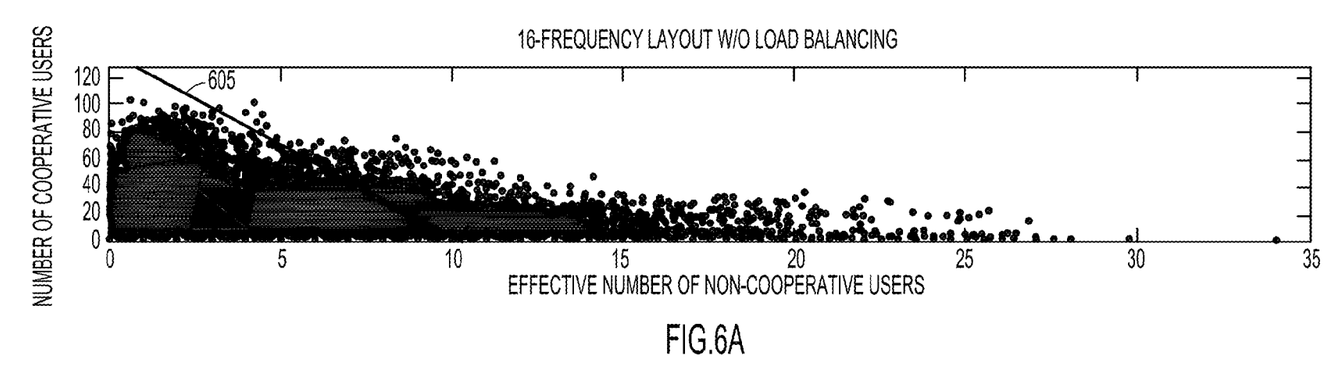
FIG. 6A is an illustration of the performance of a system of ground stations and aircraft according to a first set of parameters.
Figure 6B:
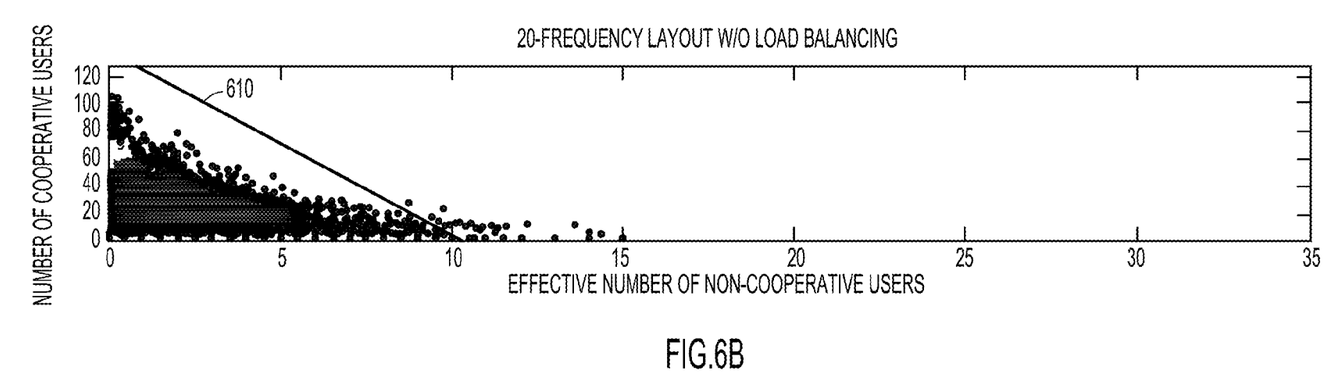
FIG. 6B is an illustration of the performance of a system of ground stations and aircraft according to a second set of parameters.

Depicted in FIGS. 6a-d are graphical depictions of the performance benefits achieved by the techniques described herein. In FIGS. 6a and 6b the techniques described herein have not been implemented, and in FIGS. 6c and 6d the techniques described herein have been implemented.

In the graphs, each point represents a ground stations, such those depicted in FIG. 1. The location of each ground station along the x-axis indicates the average number of non-cooperative aircraft associated with each ground station, while the location of each ground station along the y-axis indicates the number of aircraft assigned to the ground station. The points located under lines 605, 610, 615 and 620, respectively, are the ground stations which are meeting their performance requirements, while the points outside of lines 605, 610, 615 and 620, respectively, are those which are failing to meet their performance requirements.

In FIG. 6a, a total of 16 operational frequencies are used across the system of ground stations and aircraft, in which the techniques taught herein have not been implemented. Accordingly, there are a significant number of ground stations which fail to meet their performance requirements. Even in FIG. 6b where the number of operational frequencies has been increased to 20, there are still a significant number of ground stations that fail to meet their performance requirements.

Figure 6C:
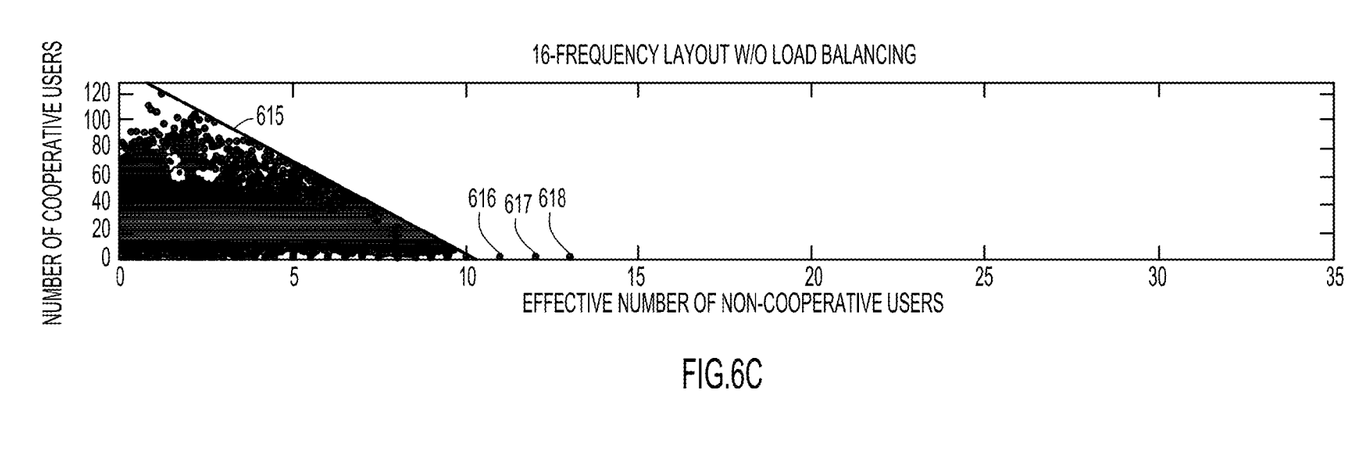
FIG. 6C is an illustration of the performance of a system of ground stations and aircraft according to a third set of parameters.

Alternatively, in FIG. 6c, where only 16 communication frequencies are used, substantially all of the ground stations meet their performance requirements through the techniques taught herein. Additionally, the small number ground stations which fail to meet their performance requirements, ground stations 616-618, do not have any aircraft assigned to them.

Figure 6D:
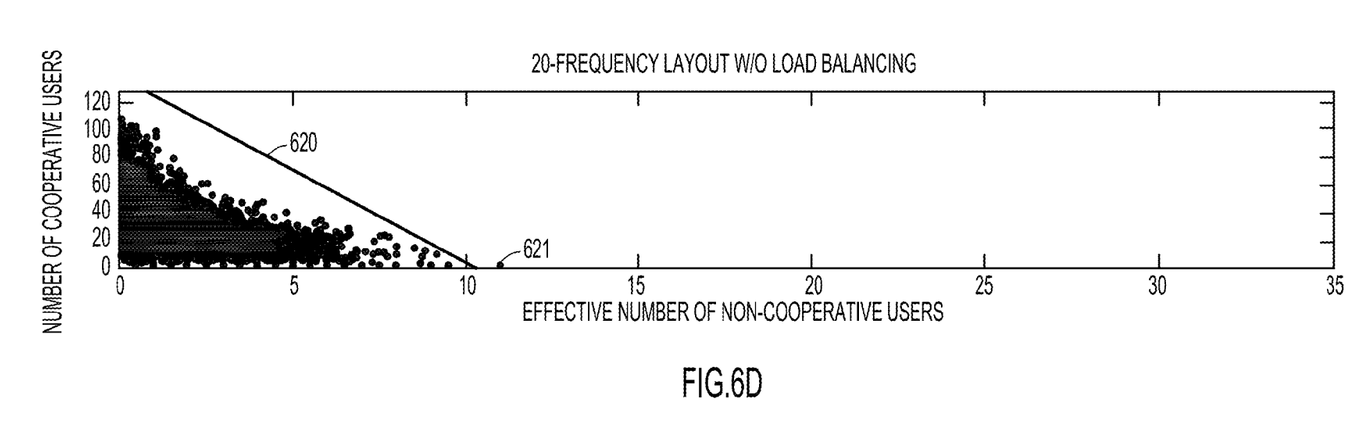
FIG. 6D is an illustration of the performance of a system of ground stations and aircraft according to a fourth set of parameters.

Similarly, in FIG. 6d, where 20 communication frequencies are used, only ground station 621, which has no aircraft assigned to it, fails to meet its performance requirements. Furthermore, the aircraft under line 620 are farther from meeting the performance threshold, and therefore, are less likely to fail with the assignment of additional aircraft.

Figure 7:
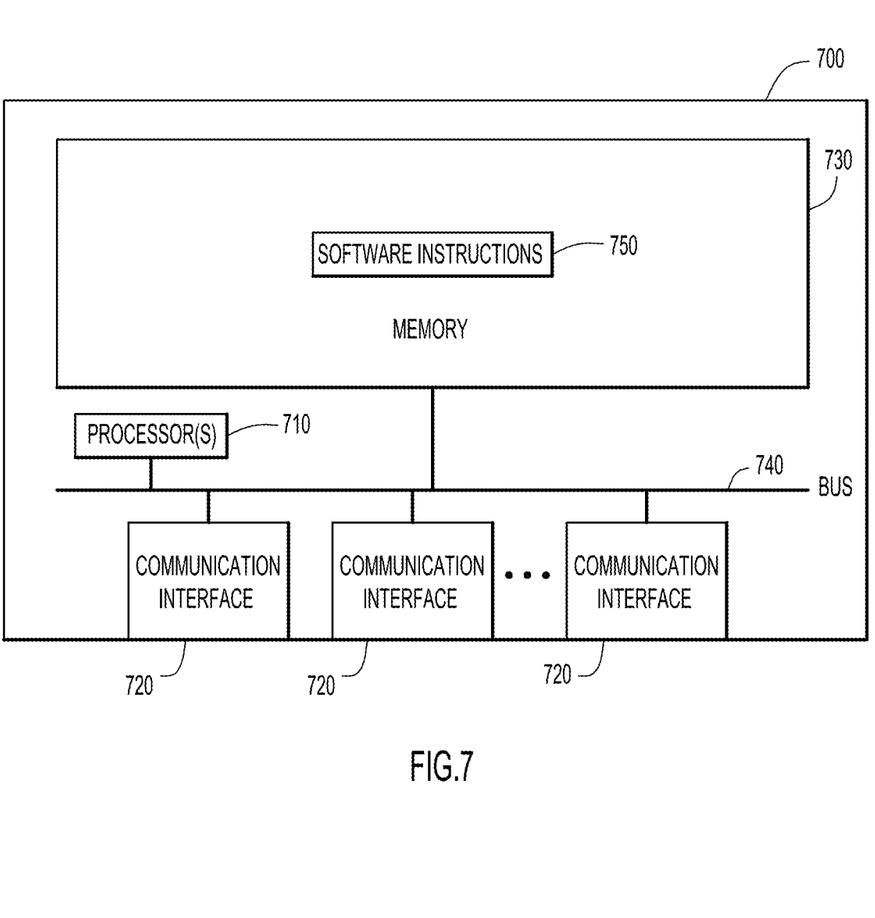
FIG. 7 is an example block diagram of a device configured to perform reassignment of mobile devices from a first base station to a second base station.

With reference now made to FIG. 7, depicted therein is an example block diagram of a device 700 configured to perform the techniques described herein. The device 700 comprises processor(s) 710, communication interfaces 720 and memory 730. For simplicity, the communication interfaces 720 may be referred to collectively as a communication interface unit, which is configured to receive information related to mobile devices, such as aircraft, and base stations, such as ground stations. The information received through communication interfaces 720 is forwarded to the processor(s) 710 through bus 740. The memory 730 comprises software instructions 750 for performing the techniques taught herein.

Memory 750 may comprise read only memory (ROM), random access memory (RAM), magnetic disk storage media devices, optical storage media devices, flash memory devices, electrical, optical, or other physical/tangible (e.g., non-transitory) memory storage devices. The processor(s) 710 is, for example, a microprocessor or microcontroller that executes instructions for performing the techniques described herein. Thus, in general, the memory 740 may comprise one or more tangible (non-transitory) computer readable storage media (e.g., a memory device) encoded with software comprising computer executable instructions 750. When instructions 750 are executed (by the processor(s) 710) device 700 is operable to perform the operations described herein in connection with FIGS. 1-5.

Device 700 may be implemented in a central location which reassigns multiple aircraft according to the techniques taught herein. In such an implementation, the device may receive information, such as altitudes, locations, velocities, and other considerations for all of the relevant mobile devices and base stations through communication interfaces 720. According to other embodiments, device 700 may be implemented in a ground station which reassigns mobile devices approaching and/or leaving the base station. Device 700 may also be implemented within the mobile devices, with each mobile device determining to which base station it should be reassigned.

The above description is intended by way of example only.

What is claimed is:
1. A method comprising:
  determining via a processor whether to reassign a mobile device from a first base station to a second base station, wherein the second base station is one of a plurality of base stations whose operational performance may be impacted by reassigning the mobile device to the second base station, wherein the determining includes:

evaluating for each of the plurality of base stations an expected performance that would result from assigning the mobile device to the second base station; and reassigning the mobile device to the second base station in response to the expected performance of each of the plurality of base stations meeting operational performance requirements.

2. The method of claim 1, wherein the operational performance of the plurality of base stations may be negatively impacted by reassigning the mobile device to the second base station.

3. The method of claim 1, wherein:

determining whether to reassign a mobile device from a first base station to a second base station comprises determining whether to reassigned an aircraft from a first ground station to a second ground station;

evaluating for each of the plurality of base stations comprises evaluating for each of the plurality of ground stations; and assigning the mobile device to the second base station comprises assigning the aircraft to the second ground station.

4. The method of claim 3, wherein the plurality of ground stations operate at a common operational frequency.

5. The method of claim 3, wherein evaluating for each of the plurality of ground stations the expected performance that would result from assigning the aircraft to the second ground station comprises calculating a number of assigned aircraft and a number of noncooperative aircraft for each of the plurality of ground stations.

6. The method of claim 5, wherein calculating the number of non-cooperative aircraft comprises calculating an average number of non-cooperative aircraft $H_i$ for a ground station i according to the following formula:

$$H_i = \frac{\sum_{k \in N_i} \sum_{j \in N \setminus W_i} vis(k, j)}{N_i}$$

where N is the set of aircraft in the plurality of aircraft, $N_i$ is the set of aircraft assigned to the ground station i, $N_i$ is the number of aircraft assigned to the ground station i, and vis(k,j) is a function that evaluates to 1 if aircrafts k and j are within line of sight of each other, and evaluates to zero if aircrafts k and j are not within line of sight of each other.

7. The method of claim 5, evaluating for each of the plurality of ground stations the expected performance that would result from assigning the aircraft to the second ground station further comprises determining a number of non-cooperative ground stations.

8. The method of claim 3, wherein evaluating for each of the plurality of ground stations the expected performance that would result from assigning the aircraft to the second ground station comprises calculating a performance $P_i$ of a ground station i according to the following formula:

$$P_i = 100 - aN_i - bH_i$$

where $N_i$ is a number of aircraft assigned to the ground station i, $H_i$ comprises an average number of non-cooperative aircraft for ground station i, and a and b are constant coefficients.

9. The method of claim 8, wherein evaluating for each of the plurality of ground stations the expected performance that would result from assigning the aircraft to the second ground station comprises determining whether Pi for each ground station in the plurality of ground stations is greater than or equal to a performance threshold.

10. The method of claim 3, wherein evaluating for each of the plurality of ground stations the expected performance that would result from assigning the aircraft to the second ground station comprises determining whether each ground station in the plurality of ground stations will meet a performance threshold after the reassignment of the aircraft.

11. The method of claim 3, further comprising repeating the determining, evaluating and reassigning steps for a second aircraft.

12. A non-transitory computer readable tangible storage media encoded with instructions that, when executed by a processor, cause the processor to:

determine whether to reassign a mobile device from a first base station to a second base station, wherein the second base station is one of a plurality of base stations whose operational performance may be impacted by reassigning the mobile device to the second base station, wherein the determining includes:

evaluate for each of the plurality of base stations an expected performance that would result from assigning the mobile device to the second base station; and reassign the mobile device to the second base station in response to the expected performance of each of the plurality of base stations meeting operational performance requirements.

13. The non-transitory computer readable tangible storage media of claim 12, wherein the operational performance of the plurality of base stations may be negatively impacted by reassigning the mobile device to the second base station.

14. The non-transitory computer readable tangible storage media of claim 12, where the processors is configured to:

determine whether to reassign an aircraft from a first ground station to a second ground station;

evaluate for each of the plurality of ground stations an expected performance that would result from assigning the aircraft to the second ground station; and assign the aircraft to the second ground station in response to the expected performance of each of the plurality of ground stations meeting operational performance requirements.

15. The non-transitory computer readable tangible storage media of claim 14, wherein the plurality of ground stations operate at a common operational frequency.

16. The non-transitory computer readable tangible storage media of claim 15, wherein the instructions further cause the processor to evaluate for each of the plurality of ground stations an expected performance that would result from assigning the aircraft to the second ground station by determining a number of non-cooperative aircraft.

17. The non-transitory computer readable tangible storage media of claim 15, wherein the instructions further cause the processor to evaluate for each of the plurality of ground stations an expected performance that would result from assigning the aircraft to the second ground station by determining a number of non-cooperative ground stations.

18. The non-transitory computer readable tangible storage media of claim 14, wherein the instructions further cause the processor to evaluate for each of the plurality of ground stations an expected performance that would result from assigning the aircraft to the second ground station by calculating a number of assigned aircraft and an average number of non-cooperative aircraft for each of the plurality of ground stations.

19. An apparatus comprising:
a memory; and
a processor coupled to the memory, and configured to:
determine whether to reassign a mobile device from a first base station to a second base station, wherein the second base station is one of a plurality of base stations whose operational performance may be impacted by reassigning the mobile device to the second base station, wherein the determining includes:
evaluate for each of the plurality of base stations an expected performance that would result from assigning the mobile device to the second base station; and
reassign the mobile device to the second base station in response to the expected performance of each of the plurality of base stations meeting operational performance requirements.

20. The apparatus of claim 19, wherein the operational performance of the plurality of base stations may be negatively impacted by reassigning the mobile device to the second base station.

21. The apparatus of claim 19, wherein the processor is configured to:
determine whether to reassign an aircraft from a first ground station to a second ground station;
evaluate for each of the plurality of ground stations an expected performance that would result from assigning the aircraft to the second ground station; and
assign the aircraft to the second ground station in response to the expected performance of each of the plurality of ground stations meeting operational performance requirements.

22. The apparatus of claim 21, wherein the plurality of ground stations operate at a common operational frequency.

23. The apparatus of claim 22, wherein the processor is further configured to evaluate for each of the plurality of ground stations an expected performance that would result from assigning the aircraft to the second ground station by determining a number of non-cooperative aircraft.

24. The apparatus of claim 22, wherein the processor is further configured to evaluate for each of the plurality of ground stations an expected performance that would result from assigning the aircraft to the second ground station by determining a number of non-cooperative ground stations.

25. The apparatus of claim 19, wherein the processor is further configured to evaluate for each of the plurality of ground stations an expected performance that would result from assigning the aircraft to the second ground station by calculating a number of assigned aircraft and an average number of non-cooperative aircraft for each of the second plurality of ground stations.

* * * * *